Aug. 15, 1967     R. J. VAN DE HEY     3,335,568
VARIABLE TORQUE CONVERTER AND CONTROL MEANS THEREFOR
Filed Dec. 6, 1965     2 Sheets-Sheet 1

INVENTOR
ROCHE J. VAN DE HEY

BY
ATTORNEY

Aug. 15, 1967  R. J. VAN DE HEY  3,335,568

VARIABLE TORQUE CONVERTER AND CONTROL MEANS THEREFOR

Filed Dec. 6, 1965  2 Sheets-Sheet 2

INVENTOR
ROCHE J. VAN DE HEY
BY
ATTORNEY

United States Patent Office 3,335,568
Patented Aug. 15, 1967

3,335,568
VARIABLE TORQUE CONVERTER AND CONTROL MEANS THEREFOR
Roche J. Van De Hey, Whitelaw, Wis., assignor to Manitowoc Engineering Corporation, Manitowoc, Wis., a corporation of Wisconsin
Filed Dec. 6, 1965, Ser. No. 511,744
14 Claims. (Cl. 60—54)

This application is a continuation-in-part of copending application for United States Letters Patent, Ser. No. 121,179, filed June 30, 1961, now United States Letters Patent 3,221,896, issued Dec. 7, 1965, and entitled, Crane Drive System.

The present invention relates, generally, to a torque converter of the type wherein the torque output thereof may be controllably varied while the input to the converter is maintained substantially constant.

More particularly, the present invention pertains to a variable torque converter apparatus having control structure for controllably regulating the flow of fluid between the impeller and the turbine thereof, enabling a controllable variation of the torque output thereof.

In machines such as crane-type excavators, it is customary to provide on or more engines to drive the several functions of the machines, the power being transmitted and controlled by means of variable torque converters and friction-clutch devices. The speed of the engine or engines is normally maintained substantially constant, and the output of the torque converters is controllably varied to compensate for load changes on the machine. It is therefore important in such a machine to provide variable torque converters of a type wherein the torque output thereof can be easily and effectively controllably varied while the input to the torque converters is maintained at a substantially constant value.

Having in mind each and every one of the aforesaid criteria, and others that will be readily apparent to those skilled in the art, it is a primary object of the present invention to provide torque converter apparatus that is so constructed and arranged as to enable the torque output thereof to be controllably varied, while maintaining the input to the torque converter at a substantially constant value.

Another primary object of this invention is to provide variable torque converter apparatus comprising control structure that is selectively moveable over the impeller or driving member of the torque converter to regulate the flow of fluid between the impeller and the turbine or driven member thereof, enabling the torque output of the converter apparatus to be effectively controllably varied.

Yet another primary object of the present invention is to provide variable torque converter apparatus having control structure that is selectively movable over the impeller or driving member of the torque converter to regulate the flow of fluid between the impeller and the turbine or driven member thereof, enabling the torque output of the converter to be controllably varied, said control structure comprising a control member and positioner or positioning apparatus that serves to effectively control the movement of the control member over the impeller of the torque converter to accurately vary the torque output thereof.

A further primary object of this invention is to provide variable torque converter apparatus having control structure that is selectively movable over the impeller or driving member of the torque converter to regulate the flow of fluid between the impeller and the turbine or driven member thereof, enabling the torque output of the converter to be controllably varied, said control structure comprising a control member and a positioner or positioning arrangement that serves to effectively control the movement of the control member over the impeller of the torque converter to accurately vary the torque output thereof, said positioner or positioning arrangement being so constructed and arranged as to control the movement of the control member over the torque converter impeller at substantially diametrically opposed locations so as to insure a uniform and accurate movement of the control member over the impeller.

A still further object of the present invention is to provide control structure for variable torque converter apparatus, said structure comprising a substantially annular, sleeve-like control member that is axially moveable over the outer diameter of the impeller or driving member of the converter apparatus to regulate the flow of fluid between the impeller and the turbine or driven member of the converter apparatus, enabling the torque output of the converter to be effectively controllably varied, and a positioner or positioning arrangement structurally operatively associated with the converter apparatus control member, said positioner being so constructed and arranged as to effectively control the movement of the control member over the impeller of the torque converter apparatus to accurately vary the torque output thereof.

An additional primary object of this invention is to provide control structure for variable torque converter apparatus said control structure comprising a substantially annular, sleeve-like control member that is axially moveable over the outer diameter of the impeller or driving member of the converter to regulate the flow of fluid between the impeller and the turbine or driven member of the converter apparatus, enabling the torque output of the converter to be effectively controllably varied, and a positioner or positioning arrangement structurally operatively associated with said control member at substantially diametrically opposed points, enabling the presentation of an accurate control over the axial movement of said control member, further enabling accurate control over the torque output of the converter apparatus.

Another primary object of the present invention is to provide variable torque converter apparatus having a control sleeve that is selectively moveable over the impeller or driving member of the converter apparatus to regulate the flow of fluid between the impeller and the turbine or driven member thereof, enabling the torque output of the converter apparatus to be controllably varied, and control structure operatively associated with said control sleeve to effectively control the movement thereof over the impeller of the converter apparatus, enabling the torque output of the apparatus to be accurately varied.

Still another primary object of this invention is to provide variable torque converter apparatus having a control sleeve that is selectively moveable over the impeller or driving member of the converter apparatus to regulate the flow of fluid between the impeller and the turbine or driven member thereof, enabling the torque output of said apparatus to be controllably varied, and control structure operatively associated with said control sleeve for effectively controlling the movement thereof over the impeller of the converter apparatus, enabling the torque output thereof to be accurately varied, said control structure comprising a yoke-type control element structurally operatively associated with said control sleeve at substantially diametrically opposed points, and positioner structure operatively associated with said yoke-type control element.

Other objects and important features of this invention will be apparent from a study of the specification following taken with the drawings, which together show, describe, disclose and illustrate the preferred embodiment of the invention and what is now considered to be the best mode of practicing the principles thereof. Still other embodiments or modifications may be suggested to those having the benefit of the teachings herein, and such other embodiments or modifications are intended to be reserved especially as they fall within the scope and breadth of the subjoined claims.

Figure 1:
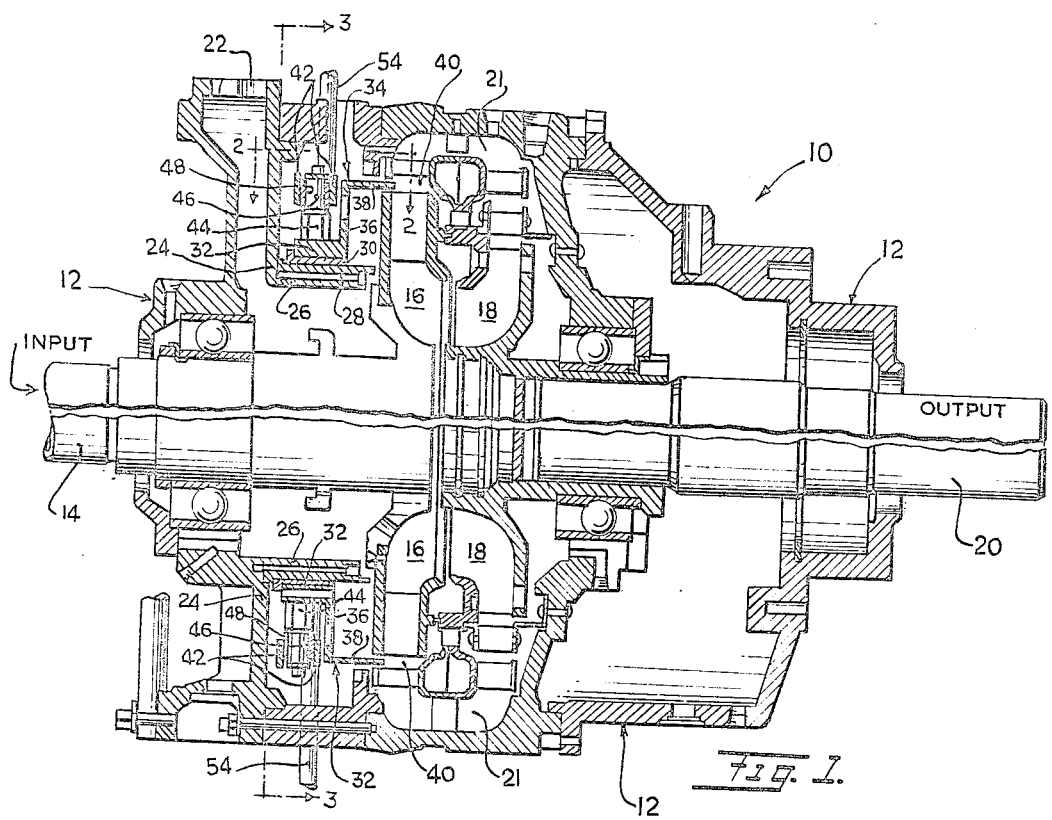
FIGURE 1 is an elevational view, partly in section, of variable torque converter apparatus constructed in accordance with the principles of the present invention, illustrating the torque output control member or sleeve in different positions in the upper and lower portions thereof.

With reference now to the drawings, and, in particular, to FIGURE 1 thereof, there is illustrated therein variable torque converter apparatus 10, constructed in accordance with the principles of the present invention. The converter apparatus, in many respects, may be of any suitable and conventional construction. Accordingly, it is not deemed necessary to present a detailed description and disclosure herein. However, and, in order to facilitate an understanding of the present invention, it will be understood that the converter apparatus comprises a housing 12, within one end of which there is rotatably disposed or positioned an input shaft 14. A vaned impeller or driving member 16 is structurally operatively associated with or connected to the input shaft 14. A turbine or driven member 18 is disposed or positioned adjacent the impeller 16, the turbine member being fixedly structurally operatively associated with or connected to an output shaft 20. The output shaft 20 is, in turn, rotatably positioned within the torque converter casing 12, substantially at an opposite end thereof. The casing 12 comprises a chamber 21, and an inlet port 22. It is through the medium of this chamber and the inlet port that fluid may be introduced or conveyed, in any suitable manner, to the location between the impeller 16 and the turbine 18. As is considered readily apparent, the fluid in chamber 21 serves to transmit torque from the impeller 16 to the turbine 18, and, therefore, from the input shaft 14 to the output shaft 20 in a manner that is also considered to be readily apparent.

The input shaft 14, may, for example, be connected, in any suitable manner, to a driving engine for a crane-type excavator (not shown). Similarly, the output shaft 20 may, for example, be connected, in any suitable manner, to a clutch for the swing or hoist assembly (also not shown), of the excavator crane. This example is presented only to facilitate an understanding of the present invention. It is not, however, intended to be limiting in any way, and, accordingly, it will further be understood, that the torque converter apparatus 10 of the present invention could equally as well be utilized to provide or present a variable torque output from a constant input in any other arrangement where this type of power transmission is required, without departing from the ambit or scope of the present invention.

As hereinbefore pointed out, the present invention contemplates the provision of a variable torque output at the location of the output shaft 20. It is desirable that this result be achieved without necessitating a variation in the speed of the input shaft 14. Accordingly, the casing or housing 12 of the converter apparatus 10, comprises an inwardly extending, generally annular portion 24. An annular axially extending support member 26 is mounted or positioned upon the inner end of the annular casing portion 24 and is fixedly structurally operatively associated or secured thereto in any suitable manner, as by means of a plurality of elongated bolts 28 (see FIGURES 1 and 3). A bushing 30, is positioned upon the radially outer surface of the support member 26, and is particularly adapted to be reciprocally axially movable with respect thereto. A generally annularly configured torque output control member 34 is positioned within the casing or housing 12, and is particularly adapted to be reciprocally axially movable with respect thereto. To this end, the control member 34 comprises a radially inwardly disposed axially extending leg 32 of annular configuration, which leg is disposed or positioned upon the bushing 30 for reciprocal movement therewith. The annular control member 34 further comprises a generally radially extending intermediate leg 36, and a radially outwardly disposed axially extending leg 38. The leg 38, which is also of annular configuration, is particularly adapted to be disposed in axial alignment with an annular space 40, which space is disposed or located between the periphery of the impeller 16 and the fluid chamber 21.

In accordance with the aforesaid construction, therefore, it will be understood that the torque output control member 34 is reciprocally axially movable upon the support member 26 enabling the radially outer annular leg 38 thereof to be axially translated into and out of the annular space 40 adjcent the periphery of the impeller 16. This movement, or translation, of the outer leg 38 of the control member 34 into the space 40 serves to regulate the flow of fluid between the impeller 16 and the turbine 18 through the channel 21. Accordingly, the control member 34 performs the function of controlling the torque transmitted to the turbine 18 and the output shaft 20. The output torque of the torque converter apparatus 10 may, therefore, be varied by the selective axial positioning of the control member 34, without necessitating any change in the rotational velocity or speed of the power source (not shown), which power source is structurally operatively associated with the input shaft 14.

Figure 2:
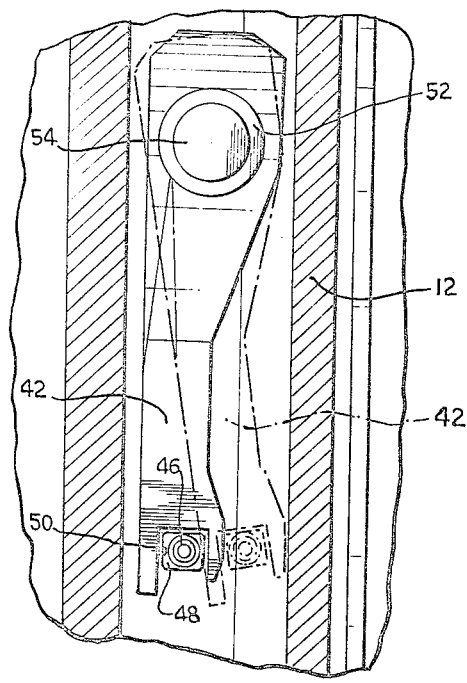
FIGURE 2 is an enlarged sectional view taken subtially along the line 2—2 in FIGURE 1.
Figure 3:
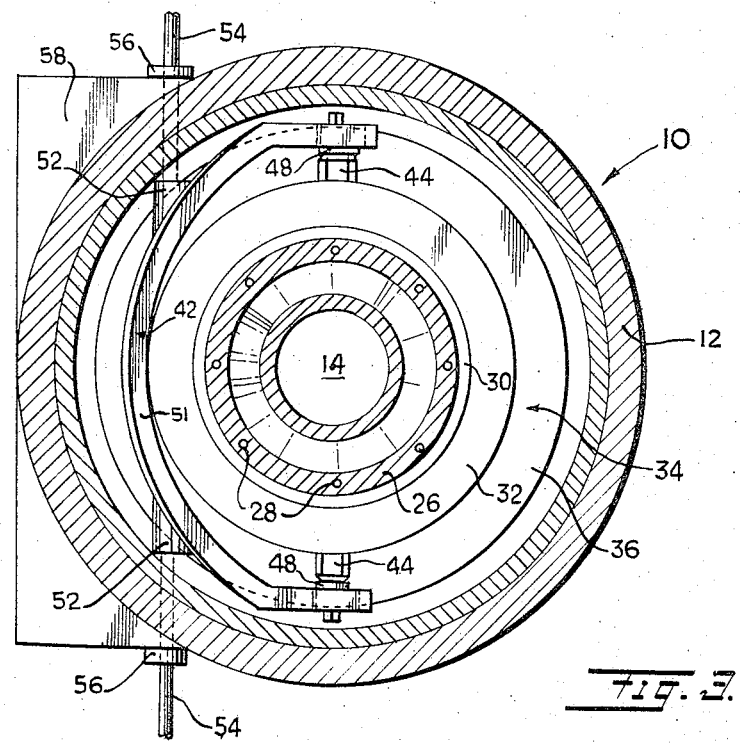
FIGURE 3 is a sectional view taken substantially along the line 3—3 in FIGURE 1.

With continued reference to FIGURES 1 through 3, the reciprocal axial translation of the control member 34 upon and with respect to the support member 26, and, therefore, the translation of the outer leg 38 of the control member into the space 40 adjacent the periphery of the impeller 16, is particularly adapted to be effected by a pivotally or rotatively translatable or movable yoke member 42. The yoke member, or yoke-type control element 42 is so configured and arranged as to be disposed about or surround approximately one-half or 180 degrees of the periphery of the inner leg 32 of the control member 34. The shanks 44 of a plurality of generally radially extending pins 46, are fixedly structurally operatively associated with or secured to the inner leg 32 of the control member. The pins 46, and, therefore, the shanks 44 thereof, are spaced approximately 180 degrees apart and, therefore, are disposed in diametrically opposed relationship with respect to the aforesaid inner leg 32. A bearing member 48, of generally rectangular configuration, is rotatively structurally operatively associated with or positioned upon each of the pins 46. The opposite ends of the yoke member or yoke-type control element 42 are bifurcated thus defining recesses 50 of substantially corresponding configuration as that of the bearing members 48. It will now be understood that the bearing members are particularly adapted to be disposed within the corresponding recesses 50 of the yoke member 42. It is considered readily apparent that the bearing members 48 and the recesses 50 may be of any suitable corresponding configuration, without departing from the scope and spirit of the present invention, it being remembered, however, that the bearing members are particularly adapted to be rotatably translated or moved with the yoke member or yoke-type control element 42.

The yoke member for control element 42 comprises longitudinally aligned tubular bosses or projections 52 on either side thereof, through each of which a rod 54 is particularly adapted to extend. The rod 54 is fixedly structurally operatively associated with or secured to each of the tubular bosses or projections 52 in any suitable manner, as by means of a friction fit or by a pin or key connection (not shown). Each of the rods 54 extend outwardly of the casing 12, and are particularly adapted to be rotatably mounted or positioned within a bearing 56. To this end, the casing 12 is provided with a boss 58, upon which the bearings 56 are particularly adapted to be fixedly positioned. It will now be understood that rotatable translation or movement of either one of the rods 54 within a corresponding one of the bearings 56 about its longitudinally extending axis results in a corresponding rotatable translation or movement of the yoke member or yoke-type control element 42 (see FIGURE 2), which, in turn, results in axial translation or movement of the control member 34, through the medium of the mutual cooperative engagement between the bifurcated ends of the yoke member or control element 42 with the bearing members 48, which bearing members, as hereinbefore pointed out, are operatively associated with or positioned upon the diametrically opposed pins 46, the pins being fixedly positioned upon the radially inner leg 32 of the control member 34.

It will now be understood that the present invention contemplates the presentation of variable output torque converter apparatus, comprising control structure that is selectively movable over the impeller or driving member 16 of the converter apparatus, to regulate the flow of fluid between the impeller and the turbine or driven member 18 thereof, enabling the torque output of the converter apparatus to be controllably varied. The control structure comprises, in turn, the control member 34, and the yoke member or yoke-type control element 42. This construction is particularly advantageous, since, as hereinbefore pointed out, the bifurcated ends of the yoke member 42 structurally cooperatively associate with the diametrically opposed pins 46 on the control member 34 to effect the movement thereof. By controlling the movement of the control member 34 at diametrically opposed points thereupon, the yoke member 42 insures accurate and uniform movement of the control member into and out of the annular space 40 surrounding the impeller 16. Accordingly, there is also insured accurate control of the torque output of the converter apparatus 10.

It will now be understood that a particular relationship is presented between the yoke member or yoke-type control element 42, and the rods 54. The control element 42 is of generally U-shaped configuration, and, thus, presents a purality of legs that are defined, at least in part, by the bifurcated ends 50, and a bight portion 51. It is at the bight portion 51 that the rods 54 are particularly adapted to be non-rotatably structurally operatively associated with or connected to the control element 42. Accordingly, any rotatable force applied to either one of the rods will be more uniformly distributed throughout the control element, as opposed to such a force being applied to one or the other of the bifurcated ends. This is particularly true when it is realized that either one of the rods can be operatively associated with a positioning arrangement, to be described presently, to apply a rotating force to the control element 42. In addition, it will be realized that, by applying a force to the control element in distal relationship with respect to the bifurcated ends 50, there is presented an increased moment arm. Accordingly, a relatively smaller rotative force is required to introduce the selected movements of the control member 34 than if the same force were applied near the ends 50.

Figure 4:
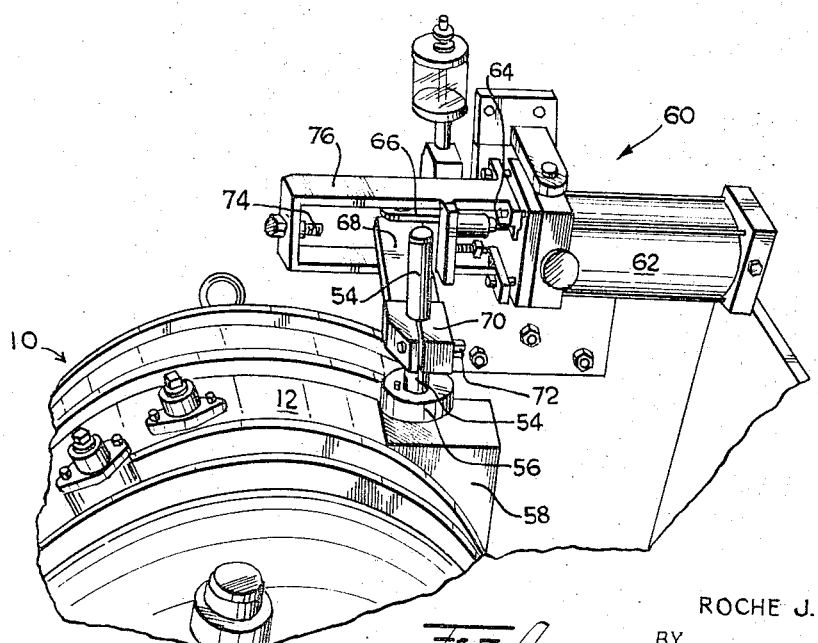
FIGURE 4 is a perspective view of the positioning structure that is particularly adapted to control the movement or translation of the torque output control member or sleeve.

With particular reference now to FIGURE 4, it will be seen that rotatable translation, or movement of either one of the rods 54, and, therefore, that of the yoke member 42, is particularly adapted to be effected by a positioner or positioning arrangement comprising a fluid control mechanism 60. The mechanism 60 comprises, in turn, a cylinder 62, and a piston (not shown) reciprocally translatable or movable therewith. Connected to the piston and extending outwardly of the cylinder 62 is a piston rod 64, with which a generally U-shaped bracket 66 is particularly adapted to be structurally operatively associated or connected. A lever 68 extending generally transversely of the bracket 66 has one end thereof pivotally structurally operatively associated therewith or connected thereto, and disposed or positioned between the legs thereof. The other end of the lever 68 is provided with a clamping member 70, which clamping member surrounds one end portion of the rod 54, and is fixedly structurally operatively associated with or secured thereto, as by means of a bolt 72. The translation or movement of the lever 68, and, therefore, that of the bracket 66 and the piston rod 64, is particularly adapted to be limited, as by means of an adjustable stop pin 74. The stop pin is mounted or positioned upon a frame 76 that surrounds the bracket 66.

The fluid control mechanism 60 is particularly adapted to normally assume the position illustrated in FIGURE 4, wherein the piston (not shown) is positioned or located at the right end of the cylinder 62, and the bracket 66 and lever 68 are located at their farthest position from the stop pin 74. To this end, the piston (not shown) may be normally biased towards the right end of the cylinder 62 (as viewed in FIGURE 4) in any suitable manner, as by means of a suitable biasing element, such as a spring (not shown), disposed or positioned within the cylinder 62. This may be accomplished by other suitable means, as, for example, by supplying fluid to and exhausting fluid from the cylinder at a location behind the piston. It will now be understood that the position of the fluid control apparatus 60, as illustrated in FIGURE 4, corresponds to the position of the control member 34 illustrated in the lower half of FIGURE 1, and to the position of the yoke member 42 shown in solid lines in FIGURE 2.

The operation of the converter apparatus 10 of the present invention is considered readily apparent from the aforesaid description and disclosure thereof. Thus, when it is desired to vary the torque output of the converter at the output shaft 20, while maintaining the input thereto at the input shaft 14, thereof, at a substantially constant value, it is merely necessary to introduce a fluid into the right side of the cylinder 62 as viewed in FIGURE 4). This may be accomplished in any suitable manner, and may be effected manually or automatically. As a result, the piston (not shown), piston rod 64 and U-shaped bracket 66, structurally operatively associated therewith or connected thereto move linearly toward the stop pin 74. This effects a pivotal or rotatable translation of the lever 68 with respect to the bracket 66, and, in particular, effects translation in a generally counter-clockwise direction (as viewed in FIGURE 4). A corresponding translation of one of the rods 54 is effected, which rod is structurally operatively associated with or secured to the lever 68 by the clamping member 70. This translation of the rod 54 effects similar translation of the yoke member 42, structurally operatively associated therewith or secured thereto from the solid line position illustrated in FIGURE 2 to the broken line position illustrated therein. This movement of the yoke member 42 results in an axial translation or movement of the control member 34 from the position shown in the lower half of FIGURE 1, wherein the radially outer leg 38 of the control member is disposed or located outwardly of the space 40, adjacent the periphery of the impeller 16 to the position illustrated in the upper half of that figure. In this latter position, the radially outer leg 38 of the control member is extended a predetermined distance to within the annular space 40, disposed between the periphery of the impeller 16, and the chamber 21, creating a restriction of the flow of fluid from the impeller through the chamber 21 to the turbine 18. This restriction of flow between the impeller 16 and the turbine 18 serves to decrease the output of the converter apparatus 10 by an amount that is proportional to the degree the control member 38 extends into the space 40. It has hereinbefore been pointed out, and is emphasized here, that this variation in the output of the converter apparatus 10 is effected without necessitating a change in the power input thereto.

The present invention, therefore, contemplates the provision of a variable torque converter apparatus 10 comprising control structure for varying the output thereof, while enabling the input to be maintained at a substantially constant value. Since the translation or movement of the control member 34 is effected at diametrically opposed points with respect thereto, the control structure insures that the radially outer leg 38 of the control member is accurately and uniformly translated or moved a predetermined or preselected distance into the annular space 40 surrounding the impeller 16. Thus, there is provided an accurate control of the torque output of the converter apparatus.

It will be understood that certain terminology has been used in the aforesaid description and disclosure of the converter apparatus 10 of the present invention, to facilitate an understanding thereof. Thus, for example, there has been described variable torque converter apparatus 10 comprising control structure that is so constructed and arranged as to be selectively movable over the impeller or driving member 16 thereof, to regulate the flow of fluid between the impeller and the turbine or driven member 18 of the converter, enabling the torque output thereof to be controllably varied. In this instance, the control structure comprises the control member 34, and a positioner or positioning arrangement comprising, in turn, the yoke member or yoke-type control element 42, and, the fluid control mechanism 60. It will now be understood that other and additional language is equally applicable. For example, it can be said that the present invention contemplates the provision of variable torque converter apparatus 10, comprising a control element 34 that is particularly adapted to be selectively movable over the impeller or driving member 16 thereof, and control structure for effecting the selective movements of the control member. In this instance, the control structure comprises the yoke member or yoke-type control element 42, and a positioner or positioning arrangement comprising the fluid control mechanism 60.

Additionally, certain directional terminology has been used in a relative sense, also to facilitate an understanding of the present invention. For example, the phrase "radially inner" has been used as has been the phrase "radially outer." This terminology is intended in its normal and accepted sense, and is not in any way intended to be limiting. Accordingly, the broadest possible interpretation, construction, definition, and the like, is to be attributed thereto.

While the invention has been described, disclosed, illustrated and shown in terms of an embodiment or modification which it has assumed in practice, the scope of the invention should not be deemed to be limited by the precise embodiment or modification herein shown, illustrated, described or disclosed, such other embodiments or modifications intended to be reserved especially as they fall within the scope of the claims here appended.

What is claimed is:

1. Variable torque converter apparatus, comprising, in combination:
   a housing;
   a power input shaft rotatably mounted within said housing;
   an impeller secured to said input shaft for rotation therewith;
   an output shaft rotatably mounted within said housing;
   a turbine secured to said output shaft and disposed adjacent said impeller;
   said housing having:
   a chamber disposed between said impeller and said turbine in which a fluid is contained for transferring torque from said impeller to said turbine;
   a generally annular support member positioned within said housing adjacent said impeller;
   a generally annular torque output control member surrounding said support member, and having:
   a radially inner axially extending leg reciprocally positioned upon said support member for axial movement with respect thereto;
   an intermediate leg extending generally radially outwardly of said impeller; and
   a radially outer axially extending leg positioned to be insertable between the periphery of said impeller, and said fluid chamber, to variably control the torque output of said converter apparatus, when the control member is axially translated upon said support member, in a direction towards said impeller;
   a plurality of radially extending pins fixedly positioned upon the radially inner leg of said control member, and being disposed in diametrically opposed relationship with respect thereto;
   each of said pins having:
   a bearing member rotatably positioned thereupon;
   a yoke-type control member positioned and extending about approximately one-half of the periphery of the radially inner leg of said control member, and having:
   bifurcated ends that define recesses within which the bearing members positioned upon said diametrically opposed pins are disposed;
   said control element having:
   a plurality of bosses positioned thereupon and on either side thereof;
   said bosses being disposed in longitudinal alignment;
   a rod positioned within each of said bosses, and extending outwardly of said housing;
   said rods being fixedly connected to said control element, enabling said rods to be rotatably translatable therewith;
   the conjoint rotatable translation of the rods and said control element, about the longitudinal axis of the rods enabling a reciprocal axial movement of said control member on the support member through the medium of the structural operative association between the bifurcated ends of the said control element, and said bearing members on the diametrically opposed member pins; and
   positioning arrangement for selectively rotatably translating said rod about its longitudinal axis, said mechanism comprising:
   a fluid-operated control mechanism having:
   a cylinder; and
   a piston reciprocally disposed therewithin, and being normally positioned at one end thereof;
   a piston rod secured to said piston and extending outwardly from said cylinder;
   a generally U-shaped bracket secured to the outer end of said piston rod; and
   a lever having one end thereof pivotally connected to said bracket and disposed between the legs thereof;
   the other end of said lever having a clamping member mounted thereupon which surrounds and is fixedly secured to said rod;
   the selective introduction of a fluid into said fluid-operated control mechanism, enabling the piston thereof, the piston rod and said bracket to be linearly translated to rotatably move said lever, the rod and said control element, further enabling an effecting of axial translation of said control member upon the support member to vary and control the torque output of said converter apparatus.

2. Control structure for effecting selective axial translation of a control between an impeller and a turbine of a variable torque converter apparatus to selectively vary the torque output thereof without necessitating variation in the torque input thereof,
   said control structure comprising:
      a control element particularly adapted to be connected to such control at generally diametrically opposed locations with respect thereto for effecting a translation thereof;

said control element comprising a member having an intermediate portion from which other portions extend about the control, and at least one elongate element nonrotatably connected to the member and extending generally outwardly therefrom with the elongate element being connected to the intermediate portion of the member for enabling any rotatable movement of the elongate element to control the position of the member.

3. In combination:

variable torque converter apparatus comprising:
a housing having:
a chamber containing a fluid;
an input shaft associated with an impeller;
an output shaft associated with a turbine;
said chamber being disposed between said impeller and said turbine for transmitting torque developing fluid therebetween; and
a control member nonrotatably carried by the housing and particularly adapted to be translatable into and out of said chamber; and
control structure for selectively translating said control member between said impeller and said turbine to regulate the flow of fluid between the impeller and the turbine and to controllably vary the torque output of said converter apparatus and comprising:
a control element connected to said control member at diametrically opposed locations with respect thereto for effecting translation of said control member, and
a positioner operatively engageable with the control element for effecting translation thereof.

4. The combination as defined in claim 3, wherein:
said control element comprises a plurality of spaced arms, an intermediate portion connecting the arms and an elongate element nonrotatably connected to the intermediate portion for enabling rotatable movement of the elongate element to the position of the member.

5. In combination:

variable torque converter apparatus comprising:
a housing having:
a chamber containing a fluid;
an input shaft driving an impeller;
an output shaft driven by a turbine;
said chamber being disposed between said impeller and said turbine for transmitting torque developing fluid therebetween; and
control structure for selectively regulating the flow of a fluid between the impeller and the turbine, and for controllably varying the torque output of said converter apparatus, and comprising:
a control member particularly adapted to be translatable into and out of said chamber;
a control element connected to said control member at diametrically opposed locations with respect thereto for effecting translation of said control member, said control element having:
a plurality of projections connected together by an intermediate portion and at least one elongate element connected to the intermediate portion and extending generally outwardly of said housing for enabling any rotatable movement transmitted to the control element by said elongate element to be substantially uniformly transmitted throughout said element.

6. The combination as defined in claim 3, wherein:
said control member comprises:
a plurality of radially spaced legs;
one of said legs being selectively insertable to within said chamber, and wherein:
said control element is connected to another of said legs at said diametrically opposed locations.

7. The combination as defined in claim 4, wherein:
said positioner comprises:
a reciprocally translatable control mechanism; and
a lever non-rotatably connected to said elongate element;
enabling the linear movements of said control mechanism to be translated into rotatable movements of said elongate element and said control element through the medium of said lever, further enabling the rotatable movements of said control element to be translated into reciprocal movements of said control member.

8. The combination as defined in claim 5, wherein:
said positioner comprises:
a reciprocally translatable control mechanism; and
a lever non-rotatably connected to said elongate element;
enabling the linear movements of said control mechanism to be translated into rotatable movements of said elongate element and said control element through the medium of said lever, further enabling the rotatable movements of said control element to be translated into reciprocal movements of said control member.

9. Control structure for effecting selective axial translation of a control member between the impeller and the turbine of a variable torque converter apparatus to selectively vary the torque output thereof without necessitating variation in the torque input, comprising:
a control element particularly adapted to be connected to said control member at diametrically opposed locations with respect thereto for effecting a translation of said control member;
said control element comprising a yoke-like member having an intermediate portion with the yoke-like member being disposed about the control member; and
at least one elongate element non-rotatably connected to the yoke-like member and extending generally outwardly therefrom with the elongate element being connected to the yoke-like member at the intermediate portion thereof for enabling any rotatable movement of the elongate element to control the position of the yoke-like member.

10. Control structure as defined in claim 9, wherein:
said yoke-like member is of generally U-shaped configuration: and wherein;
said elongate element is connected to said member at the bight portion thereof, enabling any rotatable movement transmitted thereto by said elongate element to be substantially uniformly transmitted throughout the yoke-like member.

11. Control structure as defined in claim 9, together with:
a positioner comprising:
a reciprocally translatable control mechanism; and
a lever non-rotatably connected to said elongate element;
enabling the linear movements of said control mechanism to be translated into rotatable movements of said elongate element and said yoke-like member through the medium of said lever, further enabling the rotatable movements of said yoke-like member to be translated into reciprocal movements of said control member.

12. A variable torque converter comprising:
a housing having disposed therein;

an impeller rotatably driven by an input shaft, a turbine driving an output shaft and a chamber having a fluid therein communicating between the impeller and the turbine;

a control member non-rotatably mounted for translational movement between a first position whereat the control member may at least partially restrict the flow path of a fluid in the chamber and a second position whereat the flow path of such fluid may be substantially unrestricted so that the flow path of such fluid may be varied to selectively control the torque output of the converter without varying the torque input thereof;

a control element operatively connected to the control member at spaced apart substantially opposed locations with respect thereto for effecting translation of the control member, the control element having at least a pair of arms extending to the locations; and an elongate element, journalled for rotative movement, non-rotatably carrying the arms for transmitting movement of the elongate element into movement of the control element to selectively position the control element and the control member.

13. The torque converter of claim 12 wherein, the control element has an intermediate portion non-rotatably carrying said arms.

14. The torque converter of claim 13 wherein, the elongate element is connected to the intermediate portion of the control element for enabling any rotatable movement transmitted thereto by the elongate element to be substantially uniformly transmitted throughout the control element.

References Cited

UNITED STATES PATENTS

| | | | |
|---|---|---|---|
| 1,283,711 | 11/1918 | Everett | 60—54 |
| 2,327,647 | 8/1943 | Jandasek | 60—54 X |
| 2,350,810 | 6/1944 | Pentz | 60—54 X |
| 2,586,136 | 2/1952 | Wyndham | 60—54 |
| 2,683,350 | 7/1954 | Odman | 60—54 |

OTHER REFERENCES

Ser. No. 398,686, Lang et al. (A.P.C.), published June 1943.

EDGAR W. GEOGHEGAN, *Primary Examiner.*